United States Patent [19]

Byrd

[11] Patent Number: 4,763,333

[45] Date of Patent: Aug. 9, 1988

[54] WORK-SAVING SYSTEM FOR PREVENTING LOSS IN A COMPUTER DUE TO POWER INTERRUPTION

[75] Inventor: Kerry Byrd, Falls Church, Va.

[73] Assignee: Universal Vectors Corporation, Washington, D.C.

[21] Appl. No.: 894,570

[22] Filed: Aug. 8, 1986

[51] Int. Cl.[4] .................... G06F 11/00; G06F 13/00
[52] U.S. Cl. ................................ 371/66; 364/200; 365/228
[58] Field of Search ................ 371/66; 364/200, 900; 365/228, 229

[56] References Cited

U.S. PATENT DOCUMENTS

| | | | |
|---|---|---|---|
| 4,323,987 | 4/1982 | Holtz et al. | 365/229 |
| 4,327,410 | 4/1982 | Patel et al. | 364/200 |
| 4,402,057 | 8/1983 | Itou et al. | 364/900 |
| 4,412,284 | 10/1983 | Kerfone et al. | 364/200 |
| 4,447,887 | 5/1984 | Imazeki et al. | 364/900 |
| 4,458,307 | 7/1984 | McAnlis et al. | 364/200 |
| 4,631,658 | 12/1986 | Easthill | 371/66 X |
| 4,658,352 | 4/1987 | Nagasawa | 364/200 |

Primary Examiner—Charles E. Atkinson
Attorney, Agent, or Firm—Burns, Doane, Swecker & Mathis

[57] ABSTRACT

A device for preventing unintentional loss of data in a computer system as a result of electrical power interruption comprises a standby power supply, a monitor circuit for generating signals when the main power is interrupted and restored and for monitoring the condition of the uninterruptible supply, and an auxiliary memory circuit. The memory circuit includes a large non-volatile or continuously powered memory and a program stored in ROM which takes over control of the computer and is executed by the CPU when a power interruption is signalled by the monitor circuit. The program allows operations already in progress to be completed and then directs a transfer of the computer's operating state and any application programs and operating system from the computer's RAM to the memory circuit's auxiliary memory. When main power is restored, the ROM program directs the CPU to reload the application programs and operating system into the computer's RAM and to restore the state of the CPU.

18 Claims, 12 Drawing Sheets

WORK-SAVING SYSTEM FOR PREVENTING LOSS IN A COMPUTER DUE TO POWER INTERRUPTION

BACKGROUND OF THE INVENTION

The present invention relates to computer systems that are protected against the loss of data stored in volatile memories as a result of electric power interruption.

One method of avoiding memory loss has been the use of an uninterruptible power supply which is inserted between the computer to be protected and the AC power line. Typically, an uninterruptible power supply (UPS) consists of a storage battery, a battery charger, and an inverter; both the input and the output of the UPS are AC. Under normal conditions AC from the power line is rectified to DC and then inverted back to AC for output to the computer. When the AC power line is interrupted, i.e., its voltage drops below a certain minimum value, energy is drawn from the battery through the inverter.

Since the UPS effectively replaces the main power supply of the power line, the entire computer system continues to function without memory loss. The high power level necessary to operate the entire computer requires a high capacity storage battery and similarly high power battery charger and inverter. Since these components are large and expensive, the use of a UPS with a smaller computer system has not been considered cost-effective.

Reducing sufficiently the capacities of the parts of the UPS to make its cost acceptable introduces the problem of limiting the time period that the UPS can compensate for a main power interruption. The time period should be long enough to compensate for momentary or short-term power failures, but short enough to avoid excessive UPS cost. However, when the UPS battery voltage drops low enough, operation of the computer system will be disrupted in the same way as an unprotected computer. An orderly shutdown of the computer is, therefore, desirable to avoid the loss of any data that might be stored in volatile memory, i.e., memory devices which require a continuous supply of electric power to maintain their contents. An orderly shutdown of a higher capability computer includes the transfer of any data or programs from unprotected volatile memory to either a non-volatile memory or a volatile memory having a continuous power supply independent of the AC line. Once the computer has been put into a state of "suspended animation," it is particularly useful to "revive" the computer when the main power supply is restored and restart it from the condition at which it was shut down.

Devices such as those disclosed in U.S. Pat. Nos.: 4,458,307; 4,327,410; 4,307,455; and 3,286,239 provide for orderly shut down and restart of microcomputer systems but are not suitable for use with higher capability, more complex computers such as the PC-AT manufactured by the International Business Machines Corporation. The higher capability machines execute software application programs such as word processors and spreadsheets through the mediation of software operating systems such as PC-DOS and MS-DOS developed by the MicroSoft Corporation.

Portions of the operating system and application program are stored in the computer in volatile random-access memory (RAM) for faster access during program execution. The software is executed by controlling the state of the computer's central processing unit (CPU) which includes data busses, data registers, and internal switches. The state of the CPU including pointers, vectors, wait-state, etc. is the condition of the data registers and busses and the switches at a given cycle of the CPU's master clock. An orderly shutdown of a higher capability computer requires the transfer of those portions of the application program and operating system stored in volatile RAM and information on the CPU's state to either a non-volatile memory or a continuously powered memory. Restarting the computer requires reloading of the application program and operating system into the RAM and precise resetting of the CPU state. The data saving system should also operate with any software or CPU either automatically or with minimal user interaction. These features are beyond the capability of the prior art devices.

OBJECTS AND SUMMARY OF THE INVENTION

Accordingly, it is an object of the present invention to provide an inexpensive work-saving system for use with a higher capability computer to prevent unintentional loss of data.

It is a further object of the invention that the system automatically provide for an orderly shutdown of the operation of the computer It is a further object of the invention that the system restores the computer to its operating state when electric power is restored.

It is a further object of the invention that the work-saving system function automatically but allow for its possible override by a human operator.

It is a further object of the system that the additional memory provided with the work-saving system be available for use by the computer during its normal operation.

It is a further object of the invention that the work-saving system also saves the contents of auxiliary circuit boards such as extended graphics adaptor boards.

It is a further object of the invention to provide such a work-saving system that can be incorporated onto the mother board of the computer which is to be protected.

It is a further object of the invention that the work-saving system prevents the loss of data in any computer having a CPU which is driven by an operating system environment external to the CPU.

The foregoing objects and advantages are provided by a work-saving system which includes an uninterruptible power supply having a means of supplying electric power when the main power supplied by the AC line is interrupted. The system further includes a monitor circuit which generates signals when the main power supply is interrupted and restored and which monitors the condition of the power supply means. The power supply means may, for example, include a storage battery and the condition monitored may be the output voltage of the battery. The system further includes a circuit having a small read-only memory (ROM) and a much larger auxiliary memory. The ROM contains a firmware program that takes over control of the computer system and is executed by the CPU when a main power interruption is signalled by the monitor circuit. The program allows any operation already in progress in the computer to be completed and then directs the transfer of the application programs and operating system from the computer's RAM to the work-saving system's auxiliary memory and also the transfer of the operating state of the computer's CPU to the auxiliary memory. When the output voltage of the power supply means drops low enough, the computer is powered down to conserve the remaining energy of the power supply means which may continue to supply power to the work-saving system's auxiliary memory, if necessary. Upon reliable restoration of main AC power, the ROM firmware causes the CPU to reload the application program and operating system into the computer's RAM and the state of the CPU to be reset to that which was stored.

During the time interval when the computer system continues to receive power from the power supply means, a message is displayed on the output display of the computer which indicates that the main power supply has been interrupted and that the operator can take over control from the work-saving system, if desired.

BRIEF DESCRIPTION OF THE DRAWINGS

Other objects and advantages of the present invention will become apparent from the following detailed description read in conjunction with the drawings in which.

DETAILED DESCRIPTION

Figure 1:
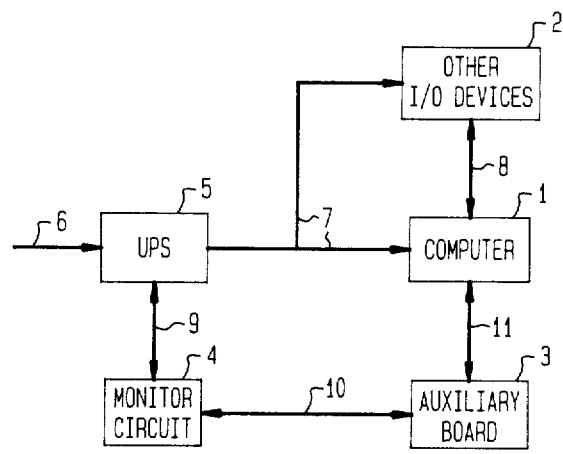
FIG. 1 is a block diagram of a computer system and the work saving system according to the present invention.

FIG. 1 shows a block diagram of the interconnections among the basic components of a typical computer system and the work-saving system of the present invention. The computer 1 receives AC power through a power conductor 7 from an uninterruptible power supply (UPS) 5. The UPS 5 receives its AC power from a main supply, e.g., a wall plug (not shown) through power conductors 6; the UPS 5 also supplies AC power to other input/output (I/O) devices 2 which communicate with the computer 1 through signal conductors 8. The other I/O devices might include, for example, a printer for producing hard copies of the computer's output and a display monitor such as a CRT.

In addition to the above-described components, FIG. 1 shows an auxiliary board 3 and a monitor circuit 4 which communicate with each other through power and signal conductors 10. The monitor circuit 4 is connected to the UPS 5 through power and signal conductors 9 and the auxiliary board 3 communicates with the computer 1 through signal conductors 11. In one embodiment, the auxiliary board 3 is a printed circuit board that is configured to plug into an open card slot in the computer 1 which might be a member of the PC-family of computers manufactured by the International Business Machines Corporation or those made by the Digital Equipment Corporation. The monitor circuit 4 and UPS 5 may also be mounted in a common housing to enhance the utility and aesthetic appeal of the system.

Figure 2:
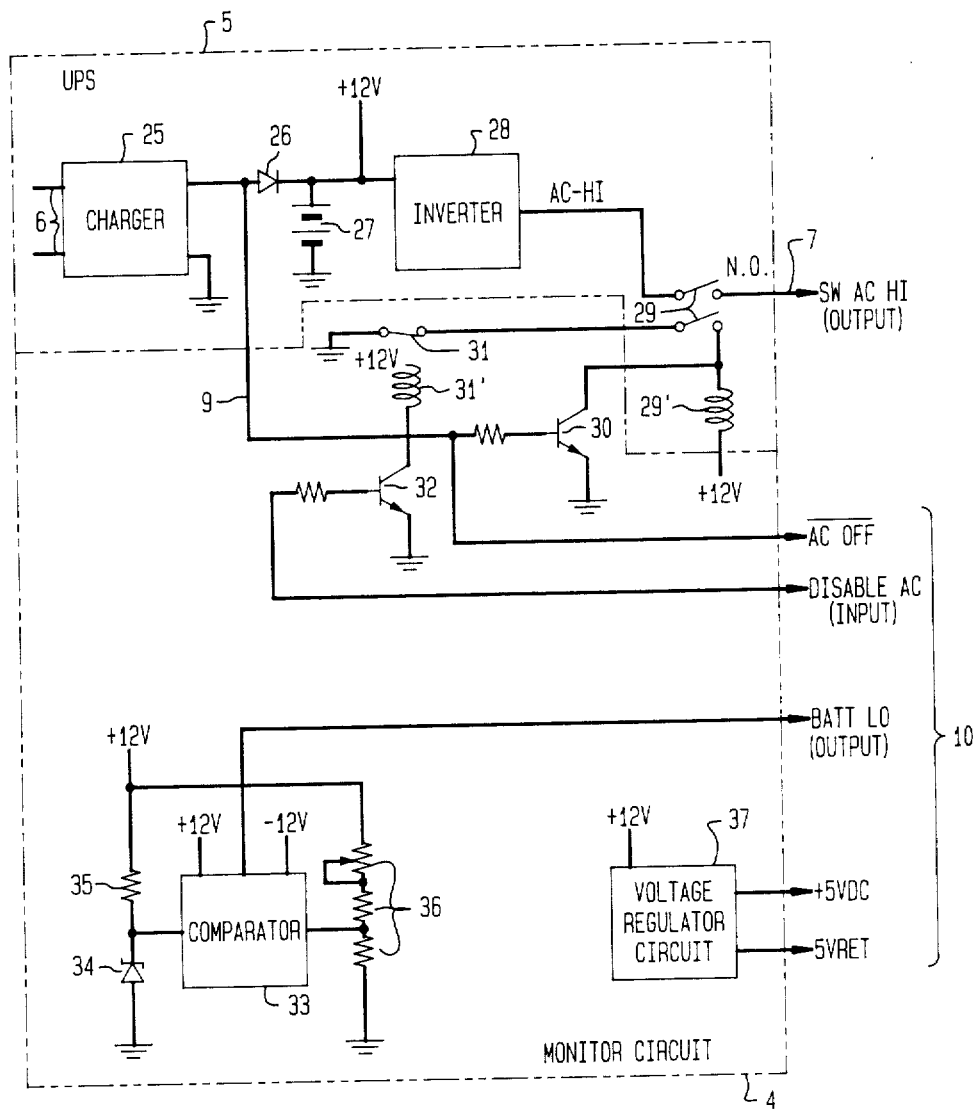
FIG. 2 is a circuit diagram of the components to be added to an uninterruptible power supply.

FIG. 2 shows more details of the UPS 5 and the monitor circuit 4 and their interconnection through power and signal conductors 9. The UPS 5 is of a type known in the prior art, comprising generally a battery charger 25 which receives AC power from the main supply through power conductors 6, a blocking device 26 such as a diode, a means 27 of supplying power when the main AC supply is interrupted or absent such as a storage battery, and an inverter 28. The charger 25 rectifies the input AC voltage to a DC voltage appropriate to the supply means 27; in one embodiment the supply means is a 12-volt battery therefore the output voltage of the charger 25 is appropriate to maintain the battery fully charged. The DC output of the charger 25 and supply means 27 is inverted back to AC by the inverter 28 and output to the computer 1 and other I/O devices 2.

When the main AC power supply is interrupted, the output of the charger 25 drops to zero or near zero but the supply means 27 continues to supply power at substantially the same voltage to the inverter 28 and through it to the rest of the system as before. In this way the system is thus unaffected by the loss of the main power supply. A blocking device such as a diode 26 is usually inserted between the power supply means 27 and the charger 25. The diode 26 allows power to flow in only one direction and is oriented to prevent the flow of power from the supply means back through the charger into the failed main power supply.

Also shown in FIG. 2 are details of the monitor circuit 4 which may be located in the same housing as the UPS 5. The output of the charger 25 is connected through conductor 9 to a transistor 30 and through conductor 10 to the auxiliary board 3. It will be appreciated that the function performed by transistor 30 can also be implemented by a Darlington-connected set of transistors. When the main AC power supply is present, the output of the charger 25 is a voltage substantially more positive than ground, e.g., 12 volts and thus transistor 30 is switched ON, thereby providing a ground path for relay coil 29' which is being supplied a voltage from power supply means 27. The energization of the relay coil 29' causes the normally-open relay contacts 29 to close. One of the contacts conducts AC power from the inverter 28 to the computer 1 and other I/O devices 2 through the power conductor 7. The other relay contact provides another ground path for relay coil 29' through another relay's normally closed contact 31.

The other relay's coil 31' is also supplied a voltage from the power supply means 27 and is similarly provided a ground return path through another transistor 32 which is normally OFF. During normal operation, therefore, relay coil 29' is energized while relay coil 31' is not. When the main power supply is interrupted, the output voltage of the charger 25 falls and transistor 30 switches OFF, however, relay coil 29' remains energized (and contacts 29 remain closed) because its ground return path is still provided through the other relay's contact 31.

As will be described in more detail below, the operation of the other relay is controlled by the auxiliary board 3 through a signal sent via one of conductors 10 to the other transistor 32. When that signal is present, while main power is interrupted, transistor 32 switches ON, thereby energizing relay coil 31' and opening relay contact 31. The ground return path for relay coil 29' is thereby broken, de-energizing that coil and opening relay contacts 29. As a result, AC power is no longer provided to the computer 1 or the other I/O devices 2, thereby conserving the energy remaining in the power supply means 27.

Also included in the monitor circuit 4 is a circuit for generating a signal when the output voltage of the power supply means 27 drops below a predetermined value. It will be appreciated that there are many equivalent circuits which can perform this function.

In one embodiment, a voltage comparator 33 has, as one input, a reference voltage provided by a zener diode 34. The reference voltage remains constant as the output voltage of the power supply means 27 decreases due to power continuing to be supplied to the computer 1 and other I/O devices 2 when the main power supply is interrupted. A resistor 35 limits the amount of current flowing through the zener diode 34. The other input of the comparator 33 is a voltage proportional to the output voltage of the power supply means 27 which can be provided by means such as the resistive divider network 36. The division factor of the network 36 is selected so that when the power supply means 27 is fully charged, the output of comparator 33 is a first voltage value and when the output voltage of the power supply means 27 drops to a predetermined level the output of comparator 33 switches to a second voltage value. The output of the comparator 33 is connected to the auxiliary board 3 by one of the conductors 10.

Besides the simplicity of its circuitry, the above arrangement avoids the inflexibility and other drawbacks associated with the use of timers, particularly for embodiments in which the power supply means 27 are storage batteries It is well known that the output voltage as a function of time of a battery varies with age, temperature and other factors. In embodiments of the present invention which include non-volatile memory devices requiring a continuous power supply independent of the main AC supply, it is important that enough stored energy remains in the power supply means 27 to continue to supply those memory devices. This can be assured despite changes in system power requirements resulting from changes in the number or electrical requirements of devices connected to power conductor 7 by employing a device that directly monitors the condition of the power supply means 27, as shown in FIG. 2. It will be appreciated that any suitable mean for storing and recovering electrical energy may be used as supply means 27.

There is also included in the monitor circuit 4 a voltage regulator circuit 37 which provides a regulated output DC voltage of, for example, 5 volts for use by components on the auxiliary board 3 that are to be independent of the main power supply. The regulator 37 is of a type known in the art and may, in an alternate embodiment, be located on the auxiliary board 3 rather than in the monitor circuit 4. In this alternate embodiment, the output voltage from the supply means 27 is connected through conductor 10 to the auxiliary board 3.

Figure 3:
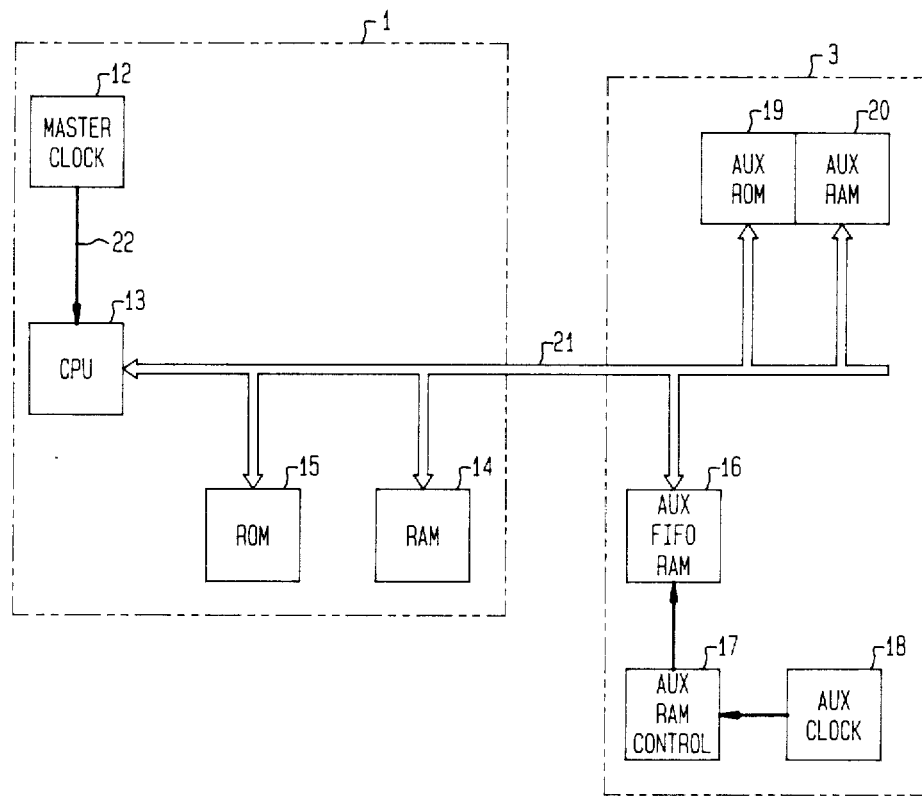
FIG. 3 is a block diagram of part of the computer system and the work-saving system according to the present invention.

FIG. 3 shows part of the interconnections between the computer 1 and auxiliary board 3. The computer 1 includes a central processing unit (CPU) 13 for performing calculations and executing program instructions provided by read-only memory (ROM) 15 and random-access memory (RAM) 14. These devices are linked by a data- and address-bus 21 and their operation is synchronized by a master system clock 12. In accordance with one embodiment of the present invention, the auxiliary board 3 includes an auxiliary ROM 19, an auxiliary RAM 20 and a large auxiliary FIFO RAM 16 which are also connected to the data- and address-bus 21. Program instructions stored in the auxiliary ROM 19 are executed by the CPU 13. The operation of the large FIFO RAM 16 is controlled by a control circuit 17 and auxiliary clock 18.

In a higher capability computer, the CPU is driven by an operating system environment that is external to the CPU, and that system is usually stored in both nonvolatile ROM and volatile RAM. The operating system is specifically designed to operate with a given type of CPU; among the popular types currently available are the 8088, 8086, 80286 and 80386 made by Intel Corp., the V20, V30 and V40 made by Nippon Electric Company, and the 68000-series made by the Motorola Corp. IBM uses the Intel family of CPUs and provides a basic input/output system (BIOS) as part of its computers' ROM. In addition, a further portion of the operating system is usually provided to allow for CPU input/output and read/write operations involving disk drive-based storage media. The MicroSoft Corp. has developed several of these programs for various computer makers and currently provides PC-DOS, versions 3.1 and 3.2 among others, for use with IBM computers. Other operating systems such as UNIX, ZENIX and VMS are also available. Because access time to internal circuit-based RAM is less than to disk-drive based RAM, modern computers typically rely heavily on internal RAM for storage of the operating system, application programs, and other data. However, the computer's internal RAM 14 is normally of the volatile type and so any contents it may have are lost when either the computer is intentionally powered down or the main power supply in interrupted. In accordance with one embodiment of the present invention, the auxiliary board 3 provides a large nonvolatile FIFO RAM 16 for storage of the contents of RAM 14 and the CPU state. When the main power supply is interrupted, the normal operation of the CPU 13 is interrupted and a program stored in an auxiliary ROM 19 is executed by the CPU.

Although the embodiment depicted in the accompanying figures uses an auxiliary circuit board that is inserted into the computer, it is within the scope of the present invention to include components necessary to accomplish the function of the auxiliary board within the main computer circuit board or "mother board" itself. It will be appreciated by one of ordinary skill in the art that the present invention can be used with any of the various types of CPU or their successors which are driven by any type of external operating system. This would include the CPUs and operating system which are employed to control automated assembly lines such as those for automobiles. Furthermore, the present invention can save the contents of other auxiliary boards such as video cards and extended graphics adaptor boards which are used with the CPU.

Referring to FIGS. 4a–4e, there are shown details of the components of the auxiliary board 3. Buffers 41 have their inputs connected to the address lines of the computer's data- and address-bus 21 and to the computer's control signals; their outputs are connected to other components on the auxiliary board 3. The buffers serve to isolate electrically the auxiliary board from the computer, thus avoiding possible undesirable interactions, while transmitting address information to the auxiliary board. Bus transceivers are connected to the data lines of the computer's data- and address-bus 21 and to other components on the auxiliary board 3. Information moves in both directions through the transceivers 42 which still help to provide electrical isolation between the auxiliary board 3 and the computer 1. Other gates and signals are provided to control the operation of the transceivers 42. One of the transceivers is used for the large auxiliary FIFO memory 16 while the other transceiver is used for the auxiliary ROM 19 and the auxiliary RAM 20.

Figure 4A:
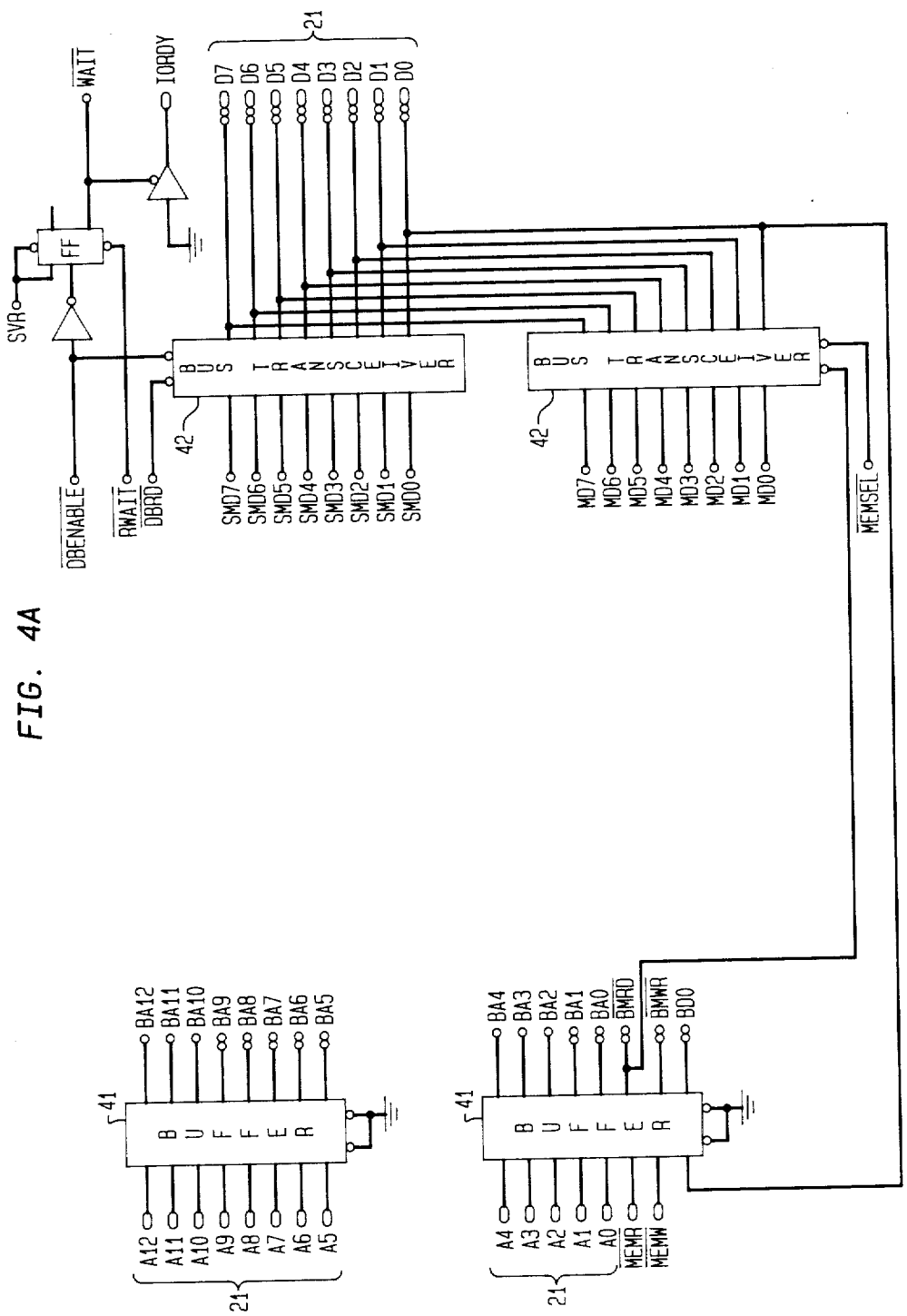
FIGS. 4a–4e are circuit diagrams of an auxiliary board according to the present invention.
Figure 4B:
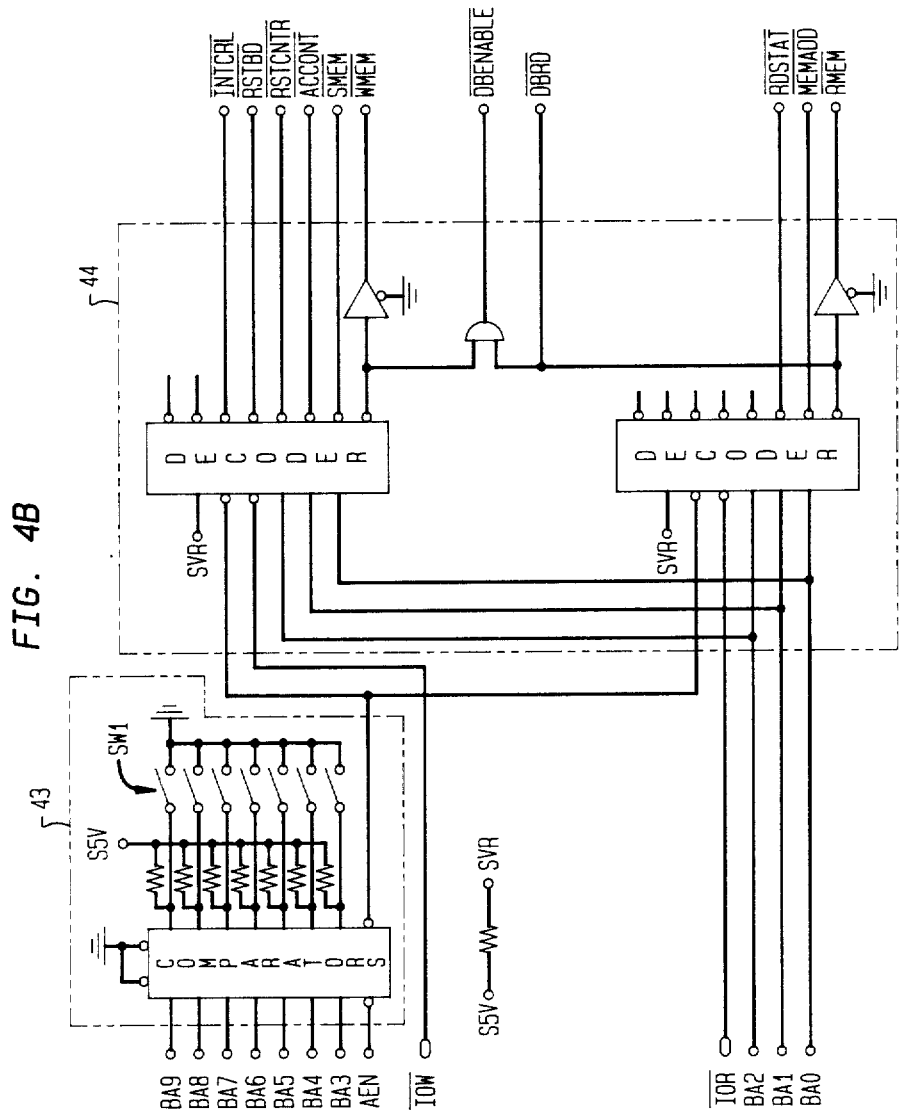

FIG. 4b shows a means 43 for setting the program address of the auxiliary board 3 and for determining when that address is received on certain of the address lines from the computer. The board address is set by selecting the ON/OFF position of a series of switches SW1. The voltage levels of the address lines are compared to the voltage levels determined by the switches; when the corresponding levels match, a decoder means 44 is enabled. The decoder means 44 then outputs one of several control signals to the other components of the auxiliary board 3 in accordance with the values of three of the address lines and the control signals IOR and IOW.

Figure 4C:
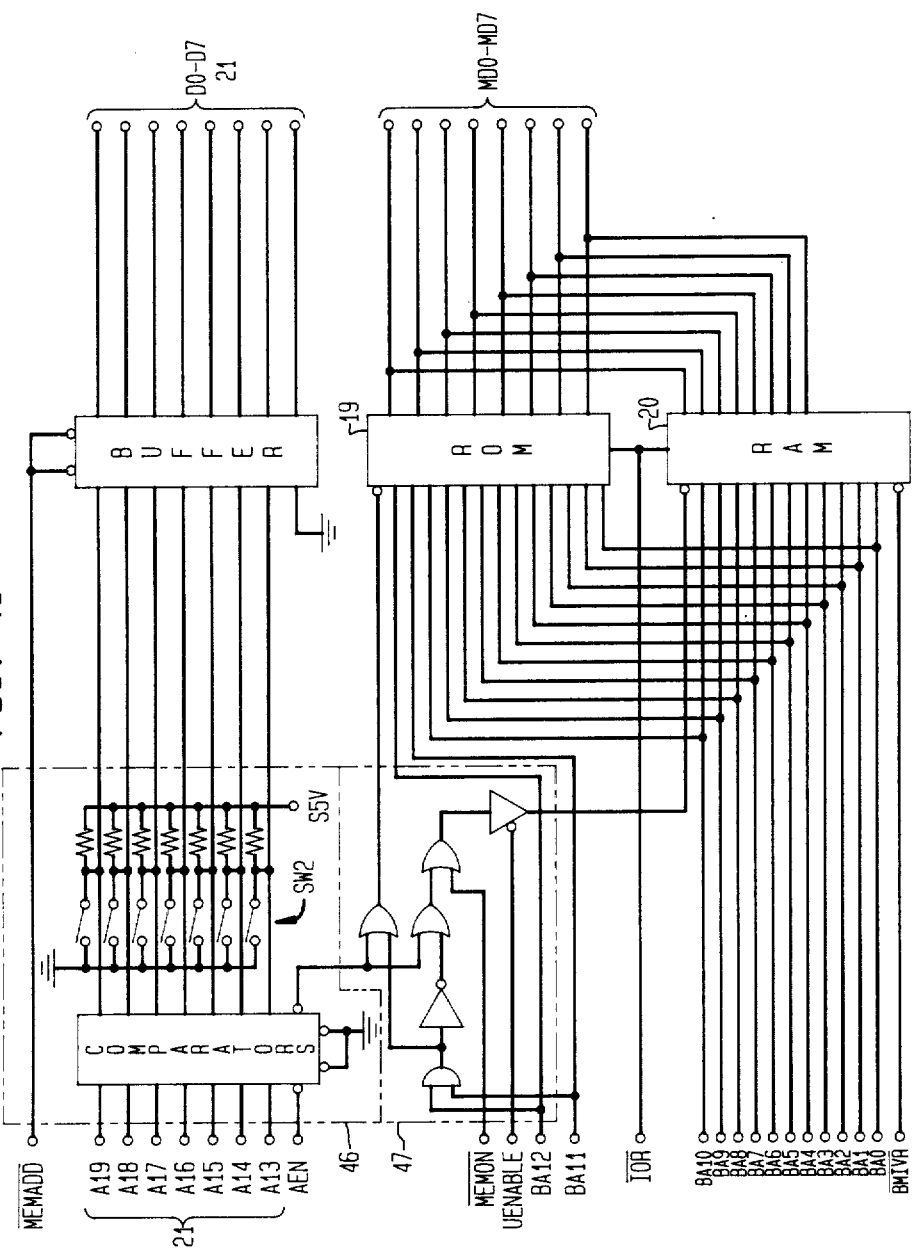

FIG. 4c shows a means 46 for setting the program address of the auxiliary ROM 19 and auxiliary RAM 20 and for determining when that address is received on certain of the address lines from the computer. The address is set by selecting the ON/OFF position of another series of switches SW2. The voltage levels of the address lines are compared to the voltage levels determined by the switches; when the corresponding levels match, the memories 19 and 20 are enabled through the operation of the enabling means 47. At the same time, the address set by the series of switches is output to the computer through a buffer. In this way, the computer is continually informed of the address of the memories 19 and 20. The ROM 19 contains substantially all of the program code used by the present invention. The instructions stored in the ROM 19 are executed by the CPU 13. RAM 20 is used to store the configuration of the computer system and the state of the CPU 13, and is a substantially smaller amount of memory than the auxiliary FIFO memory 16. The address of a particular cell in the memories 19 and 20 is input through the buffers 41 from the computer's data- and address-bus 21. Information at that cell location is then read, in the case of both memories 19 and 20, or written, in the case of RAM 20, through one of the transceivers 42 from or to the bus 21.

Figure 4D:
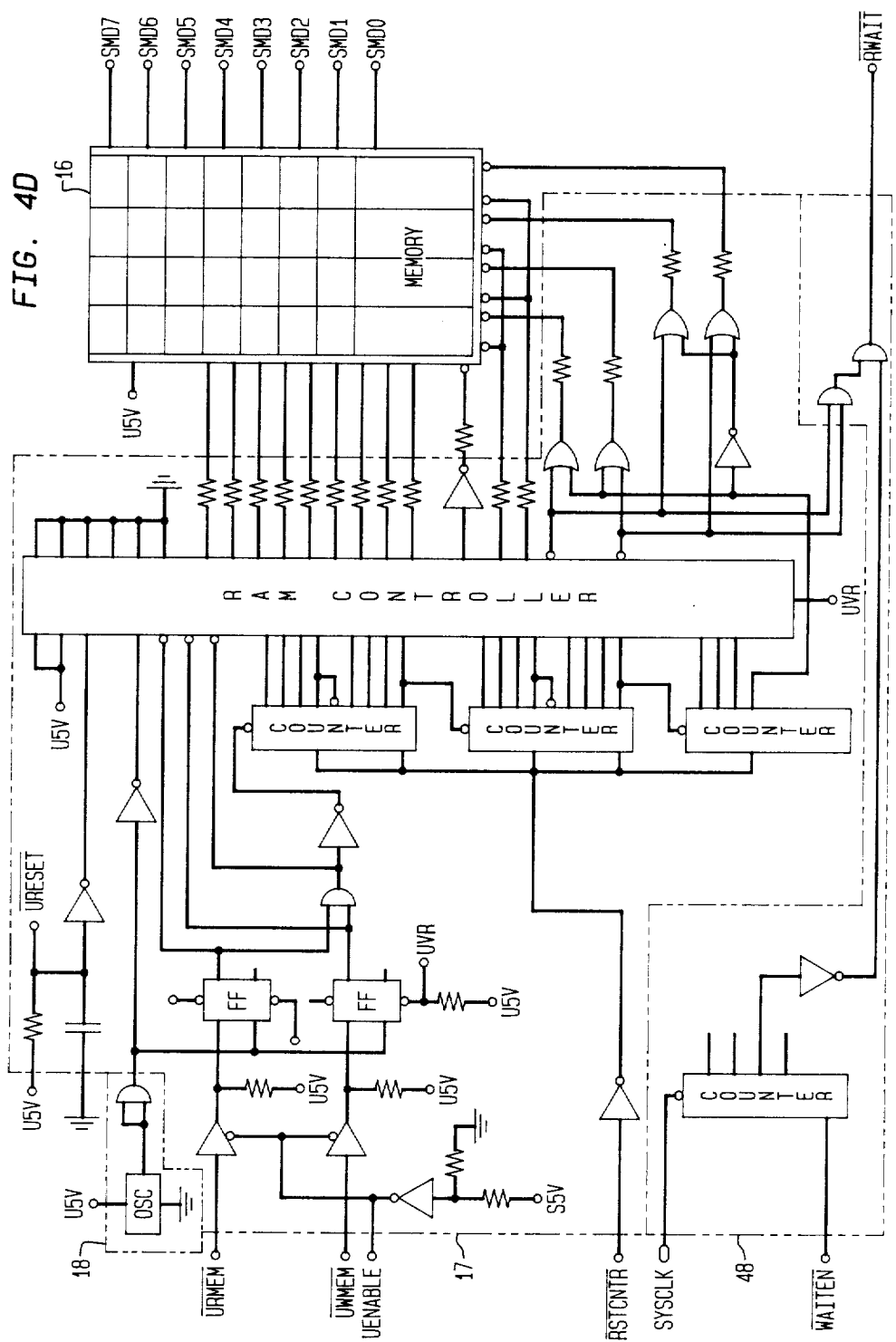

FIG. 4d shows the large auxiliary memory 16 and its control circuits 17 and clock 18. In one embodiment, the large memory 16 is an array of dynamic random access memory circuit that thus depend on a continuous supply of power to maintain their contents. In this embodiment the continuous supply of power is provided by the voltage regulator circuit 37 in monitor circuit 4. The capacity of the memory 16 need only be large enough to store the entire contents of the computer's volatile RAM 14 and the CPU state, together with the contents of any other boards the loss of which it is desired to have prevented. It will therefore be appreciated that the function of memory 16 can be performed by any suitable non-volatile random access memory including magnetic bubble or disk-drive types which do not require continuous power. The nature of the control circuit 17 and clock 18 would likewise change accordingly.

The control circuit 17 includes several gates which enable reading and writing to the memory 16 according to the condition of several control signals. In one embodiment, addresses for the cells in the memory 16 are generated sequentially by a set of counters, thus the large memory 16 operates as a first-in-first-out (FIFO) device. It will be appreciated that the addresses for the memory 16 can be provided by other forms of circuitry that would provide random access to the memory cells. Also included in control circuit 17 is an integrated circuit dynamic RAM controller which helps to control the operation of the memory 16. Finally, because of the nature of dynamic random access memory circuits, a group of OR gates provides alternating row and column address strobes for the memory 16.

The operation of the memory 16 and control circuit 17 is synchronized by the auxiliary clock circuit 18; these circuits are provided continuous power from the supply means 27 through the regulator 37 and thus continue to operate and maintain the contents of the memory 16 even when the main power supply is interrupted. The operation of the auxiliary board memory circuits is synchronized with the computer's master system clock 12 by the circuitry 48 which also ensures that there are no latch-up problems experienced by the system when the auxiliary board is installed.

It will be appreciated that the large auxiliary memory 16 may be made available to the computer operator for use during normal operation, i.e., when the main power supply is not interrupted. The memory can thus be employed in the manner of a VDisk which is a designation of the operating system PC-DOS, versions 3.1 and 3.2. The memory therefore appears to be an element of the actual hardware configuration of the computer and is treated as another peripheral device. Similarly, the large memory 16 can be made available as a RAMDisk, which is a designation of several independent software makers, or other equivalent. In embodiments of the present invention which use the large memory 16 as such a "virtual" disk drive, any contents that are stored in the memory must be removed and stored elsewhere before the memory is made available to compensate for a power failure. This can be provided by automatically evacuating the contents of the memory 16 to another non-volatile memory such as a hard disk drive peripheral before the contents of the computer's other RAM 14 and CPU state are stored.

Figure 4E:
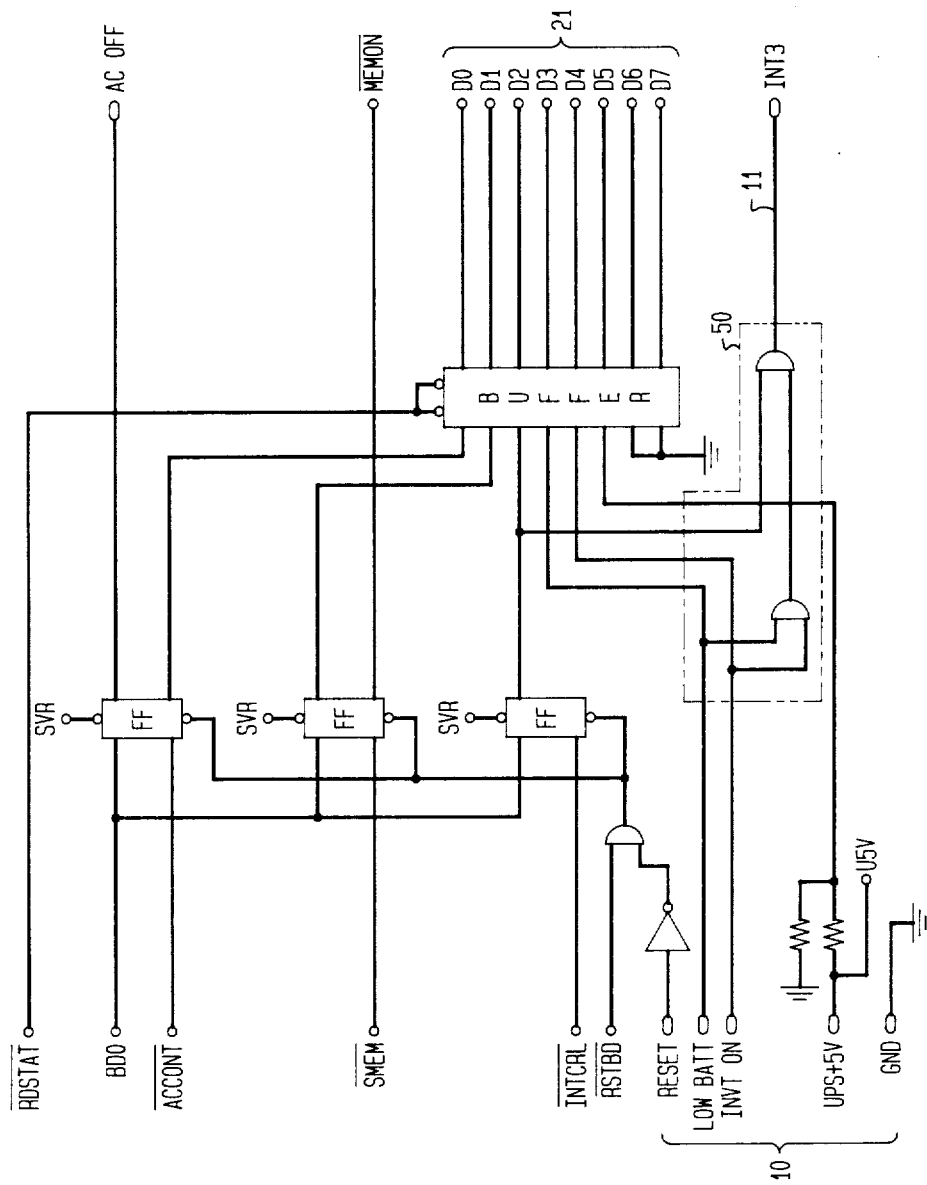

FIG. 4e shows interface circuitry between the computer and the other components of the present invention which is used to inform the CPU 13 of the status of the auxiliary board and the work-saving system. This information is transmitted through a buffer to the CPU along the bus 21 and includes status information from the UPS 5 and monitor circuit 4. A circuit 50 is provided which generates an interrupt signal for the CPU according to the simultaneous occurrence of a low-voltage signal from the comparator 33 and a signal that indicates the continuing connection of the inverter 28 to conductor 7.

The program instructions in accordance with the present invention which are executed by the CPU 13 are provided from the auxiliary ROM 19 and from the computer's RAM 14. The latter portion of the program instructions is interactive with the operating system in use with the computer. For example, in the PC-DOS environment, a small number of instructions are stored in an AUTOEXEC.BAT file which is automatically executed when the computer is powered up and the operating system "boots" up. As already noted, these instructions can be written to function with any operating system such as UNIX, ZENIX, VMS, etc. for execution by any of the various types of CPU which are driven by an operating system environment external to the CPU. In one embodiment, this RAM-resident, DOS-related program code requires 96 bytes of storage.

Figure 5A:
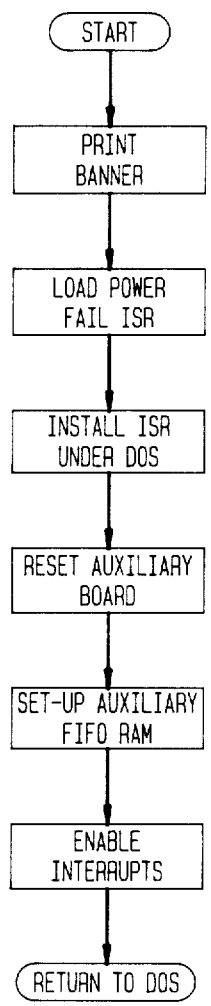
FIGS. 5a–5d are flowcharts of a firmware program according to the present invention.

FIG. 5a shows a flowchart of a system startup program module in accordance with the present invention. After a display announcing the presence of the work-saving system is sent to the system's output display, a program module called the Power Fail Interrupt Service Routine is loaded from the auxiliary ROM 19 into the RAM 14 and installed under the control of the operating system. The circuitry of the auxiliary board 3 is then reset and prepared for a power interruption by initializing or setting up the large memory 16 and enabling the interrupt signals to the CPU. After these preparations are completed, program control returns for either continued execution of the AUTOEXEC.BAT file which is a file "non-resident" under DOS or to other programs "resident" under the operating system.

Figure 5B:
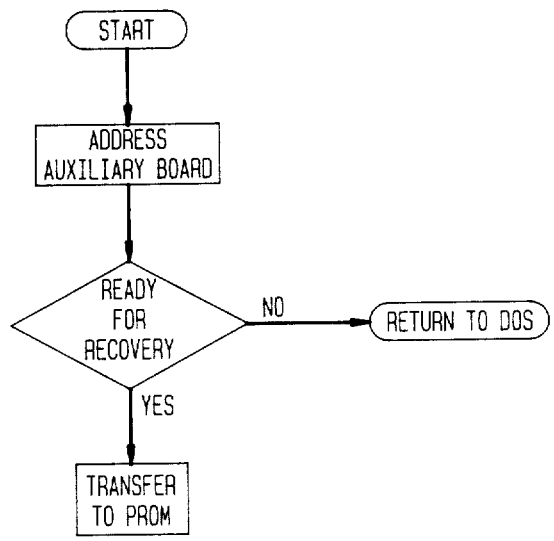

Also installed in the AUTOEXEC.BAT file is a program module for control of recovery of the computer system after a power interruption. A flowchart of this program is shown in FIG. 5b. When the system "boots up," the auxiliary board 3 is addressed and interrogated as to whether a system save in the event of a power failure has occurred. If a save has occurred, control of the CPU is transferred to firmware programs in the auxiliary ROM 19. If no save has been necessary, program control returns to the AUTOEXEC.BAT file or to the operating system for normal booting. It will be appreciated that the program can be designed to prevent a rebooting of the operation system to allow for stabilization of power conditions. Short power interrupts may require a time period to allow the computer's power supplies to drain properly before power should be reapplied. Also, means may be included to monitor the stability of the main power supply and prevent rebooting before a continuous period of stable main power has elapsed.

Figure 5C:
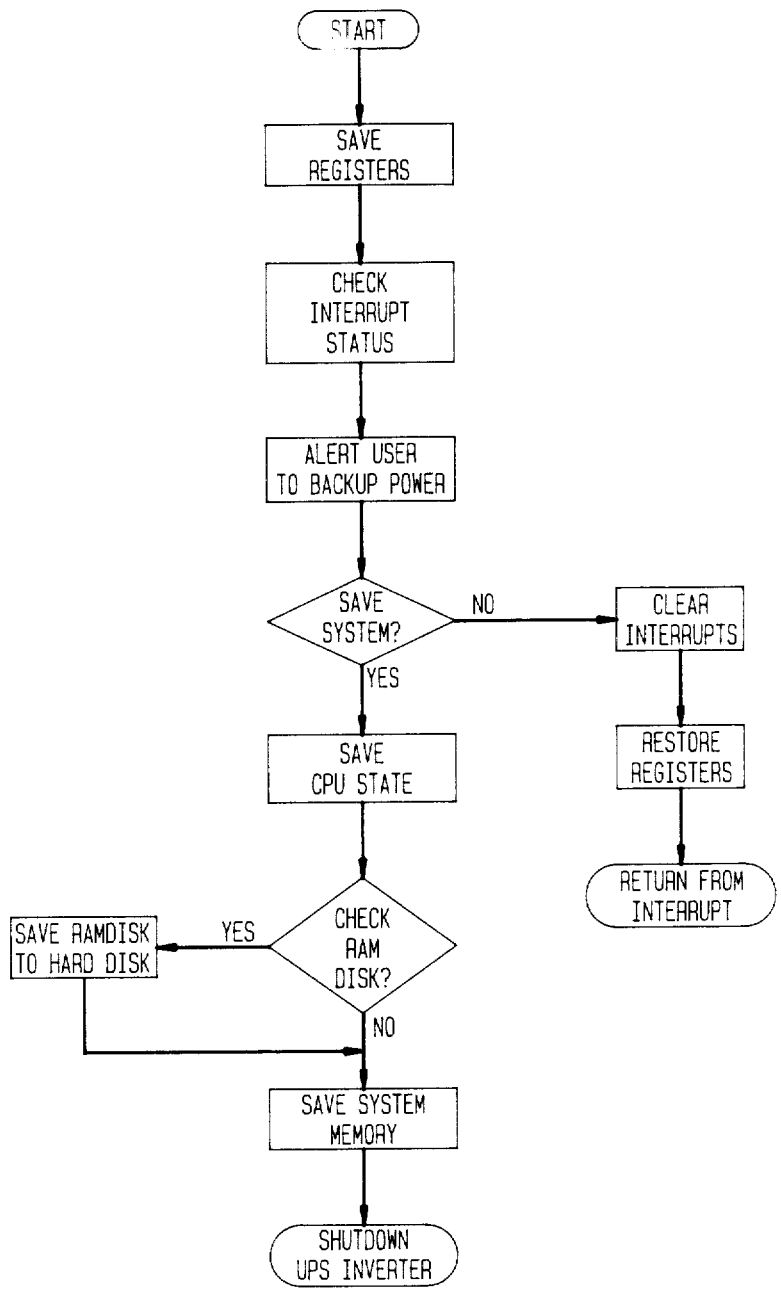

The bulk of the program code for controlling the work-saving system of the present invention is stored, in one embodiment, in the auxiliary memory 19. A flowchart of the Power Fail Interrupt Service Routine so stored is shown in FIG. 5c. When a power interruption is detected, the contents of the CPU registers are stored in the auxiliary RAM 20. The status of the interrupt signals are checked and the user is informed that the computer system is operating on backup power. At this point the operator can be given the option of overriding the continued execution of this program module. For computer system such as assembly line controllers which do not have output CRT displays, a small device such as a liquid crystal display (LCD) may be provided with the UPS 5 and monitor circuit 4. If the system is not yet to be saved. the interrupts are cleared, the values of the registers restored and CPU control is returned to its location at the start of module execution. If the system is to be saved, the CPU state consisting of stacks, vectors, pointers, etc. is saved in the auxiliary RAM 20. If the large memory 16 is being used as a RAM Disk, VDisk or equivalent, its contents are saved into a data file on a nonvolatile medium such as a hard disk. After this step or, if the large memory 16 is not being used, the contents of the computer's RAM 19 is stored in the large memory 16. The inverter 28 is then disconnected through the opening of relay contacts 29 to conserve the remaining energy stored in the supply means 27.

Figure 5D:
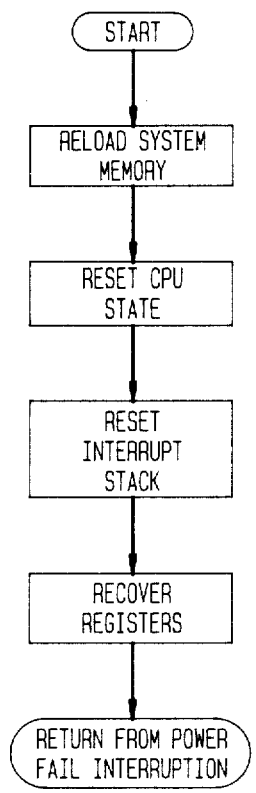

When the main power supply has been restored, another program module stored in auxiliary ROM 19 directs the recovery of the system to its condition when it was shutdown. A flowchart of this program module is shown in FIG. 5d. The contents of the computer's RAM 14 are reloaded into that RAM from the large auxiliary memory 16 and the state of the CPU is reset to its condition when it was shutdown. The CPU's interrupt stack is reset in the same way, as are the values of the CPU's registers. When these operations are complete, the computer system has been reset to exactly its condition when it was shutdown and the execution which was in progress when power was interrupted continues as if it had not been interrupted.

It will be appreciated by those of ordinary skill in the art that the present invention can be embodied in other specific forms without departing from the spirit or the essential characteristic thereof.

For example, although specifically disclosed with regard to its use with personal computers the invention also has applicability to other CPU-based systems. One such system might be a PAXB telephone exchange, where the invention operates to save the status of existing line connections so that ongoing conversations can be maintained even when the control CPU is shut down for the duration of the power failure. The presently disclosed embodiments are therefore considered in all respects to be illustrative and not restrictive. The scope of the invention is illustrated by the appended claims rather than the foregoing description and all changes that come within the meaning and range of equivalents thereof are intended to be embraced therein.

What is claimed is:

1. In a digital computer having a central processing unit (CPU) driven by an operating system environment external to the CPU and volatile random-access memory (RAM), a data protection system for preventing an unintentional loss due to an interruption of a main power supply of the computer's application program and operating system stored in RAM and the CPU's state, comprising:

means for supplying electric power to the computer and the data protection system;

means for monitoring the main electric power supply and for generating a signal indicative of an interruption thereof;

means for directing an operation of the computer and for conserving power to be supplied by the power supply means, the directing means being connected to the CPU, being responsive to the interruption signal, including an interrupt program stored in a non-volatile memory, and selectively enabling the power supply means to supply power to the computer; and means for storing the application program and operating system stored in the RAM and the CPU's state, the storing means being responsive to the directing means.

2. The data protection system of claim 1, wherein the power supply means includes a storage battery, the monitoring means generates a signal indicative of a condition of the battery, and the directing means is responsive to the condition signal and the interruption signal.

3. The data protection system of claim 1, wherein the storing means is available for normal use by the computer when main power is not interrupted.

4. The data protection system of claim 1, wherein the interrupt program directs a status message to an output display and allows an operator to override an operation of the interrupt program.

5. The data protection system of claim 1, wherein the directing means inhibits the computer from rebooting for a predetermined time interval after main power is restored after an interruption of the main power supply.

6. The data protection system of claim 3, wherein the directing means directs the computer to create a non-volatile data file for storing any contents of the storing means stored during its normal use by the computer.

7. The data protection system of claim 6, wherein the power supply means includes a storage battery for supplying power to the storing means.

8. In a digital computer having a central processing unit (CPU) driven by an operating system environment external to the CPU and volatile random-access memory (RAM), a data protection system for preventing an unintentional loss due to an interruption of a main power supply of the computer's application program and operating system stored in the RAM and the CPU's state, and for restarting the computer after the main power supply is restored, comprising:
    means for supplying electric power to the computer and the data protection system;
    means for monitoring the main electric power supply and for generating a signal indicative of an interruption thereof and a signal indicative of a restoration thereof;
    means for directing an orderly shutdown operation of the computer when the main power supply is interrupted and for restarting the computer when main power is restored, the directing means being connected to the CPU, being responsive to the signals of the monitoring means and selectively enabling the power supply means to supply power to the computer; and
    means for storing the application program and operating system stored in the RAM and the CPU's state in an auxiliary memory separate from said RAM, the storing means being responsive to the directing means.

9. The data protection system of claim 8, wherein the power supply means includes a storage battery, the monitoring means generates a signal indicative of a condition of the battery, and the directing means is responsive to the condition signal and the interruption signal.

10. The data protection system of claim 8, wherein the auxiliary memory is available for normal use by the computer when main power is not interrupted.

11. The data protection system of claim 8, wherein the interrupt program directs a status message to an output display and allows an operator to override an operation of the interrupt program.

12. The data protection system of claim 8, wherein the directing means inhibits the computer from rebooting for predetermined time interval after main power is restored after an interruption of the main power supply.

13. The data protection system of claim 10, wherein the directing means directs the computer to create a non-volatile data file for storing any contents of the auxiliary memory stored during its normal use by the computer.

14. The data protection system of claim 12, wherein the power supply means includes a storage battery for supplying power to the storing means.

15. The data protection system of claim 14, wherein the monitoring means generates the restoration signal after a predetermined time interval during which the main power supply is continuously uninterrupted, and in response to the restoration signal the directing means directs a restart of the computer including a reloading of the application program and operating system into the RAM and a resetting of the state of the CPU.

16. The data protection system of claim 15, further including an interrupt program which directs a status message to an output display and allows an operator to inhibit normal operation of the data protection system.

17. The data protection system of claim 16, wherein the directing means directs the computer to create a non-volatile data file for storing any contents of the storing means stored during its normal use by the computer.

18. In a digital computer having a central processing unit (CPU) driven by an operating system environment external to the CPU and volatile random-access memory (RAM), a method for preventing an unintentional loss due to an interruption of a main power supply of the computer's application program and operating system stored in RAM and the CPU's state, comprising the steps of:
    monitoring the main power supply and generating a first signal indicative of an interruption thereof and a second signal indicative of a restoration thereof;
    interrupting an operation of the computer is response to the first signal;
    selectively supplying backup power to the computer in response to the first signal;
    saving a contents of the RAM and CPU state to an auxiliary memory separate from said RAM in response to the first signal; and
    reloading the saved contents of the register and the RAM, and the CPU state in response to the second signal.

* * * * *

UNITED STATES PATENT AND TRADEMARK OFFICE
CERTIFICATE OF CORRECTION

PATENT NO. : 4,763,333

DATED : August 9, 1988

INVENTOR(S) : Kerry Byrd

It is certified that error appears in the above-identified patent and that said Letters Patent is hereby corrected as shown below:

ON TITLE PAGE: Item [73]

should read, "Universal Vectors Corp.,
 "Herndon, Virginia".

Signed and Sealed this

Thirteenth Day of October, 1992

*Attest:*

DOUGLAS B. COMER

*Attesting Officer*     *Acting Commissioner of Patents and Trademarks*

REEXAMINATION CERTIFICATE (1348th)
United States Patent [19]
Byrd

[11] B1 4,763,333
[45] Certificate Issued    Sep. 4, 1990

[54] WORK-SAVING SYSTEM FOR PREVENTING LOSS IN A COMPUTER DUE TO POWER INTERRUPTION

[75] Inventor: Kerry Byrd, Falls Church, Va.

[73] Assignee: University Vectors Corporation, Washington, D.C.

Reexamination Request:
No. 90/001,924, Jan. 16, 1990

Reexamination Certificate for:
Patent No.: 4,763,333
Issued: Aug. 9, 1988
Appl. No.: 894,570
Filed: Aug. 8, 1986

[51] Int. Cl.$^5$ .................. G06F 11/00; G06F 13/00
[52] U.S. Cl. .................................. 371/66; 364/200; 365/228
[58] Field of Search .................................. 371/66; 364/200 MS File, 900 MS File; 365/228, 229

[56]           References Cited
       U.S. PATENT DOCUMENTS
4,307,455  12/1981  Juhasz et al. .................. 364/900

FOREIGN PATENT DOCUMENTS
59-90295  5/1984  Japan .

OTHER PUBLICATIONS
EDN Electrical Design News, vol. 28, No. 8, Apr. 1983, "Hands-on Investigations Help Exploit CMOS Designs", R. Cushman.
IBM Technical Disclosure Bulletin, vol. 17, No. 12, May 1975, "Data Retention System", R. Capowski, A. Lee, W. Peterson.
IBM Technical Disclosure Bulletin, vol. 17, No. 5, Oct. 1974, "Saving Random-Access Memory in the Event of a Power Failure".

*Primary Examiner*—Charles E. Atkinson

[57]           ABSTRACT

A device for preventing unintentional loss of data in a computer system as a result of electrical power interruption comprises a standby power supply, a monitor circuit for generating signals when the main power is interrupted and restored and for monitoring the condition of the uninterruptible supply, and an auxiliary memory circuit. The memory circuit includes a large non-volatile or continuously powered memory and a program stored in ROM which takes over control of the computer and is executed by the CPU when a power interruption is signalled by the monitor circuit. The program allows operations already in progress to be completed and then directs a transfer of the computer's operating state and any application programs and operating system from the computer's RAM to the memory circuit's auxiliary memory. When main power is restored, the ROM program directs the CPU to reload the application programs and operating system into the computer's RAM and to restore the state of the CPU.

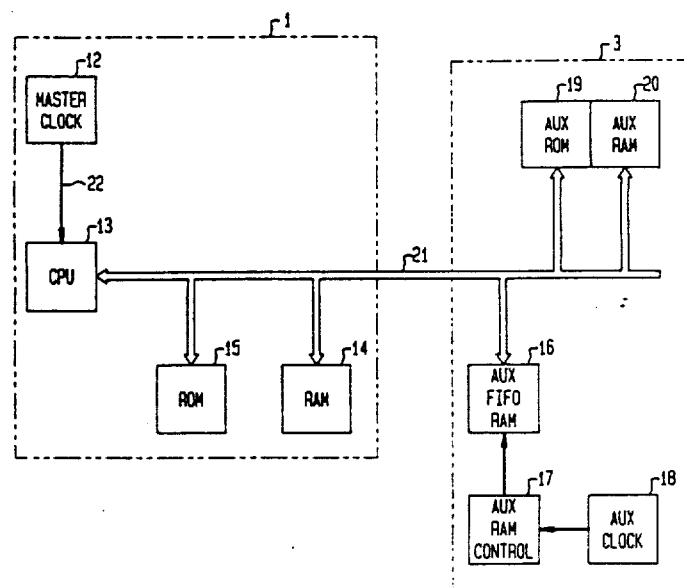

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–18 is confirmed.

* * * * *